(12) United States Patent
Schubert

(10) Patent No.: US 7,830,947 B2
(45) Date of Patent: Nov. 9, 2010

(54) FURNACE INSTALLATION AND METHOD FOR MELTING DOWN METALLIC OR METAL-CONTAINING CHARGE MATERIALS

(75) Inventor: Manfred Schubert, Oberhausen (DE)

(73) Assignee: SMS Siemag Aktiengesellschaft, Dusseldorf (DE)

( * ) Notice: Subject to any disclaimer, the term of this patent is extended or adjusted under 35 U.S.C. 154(b) by 476 days.

(21) Appl. No.: 11/883,113

(22) PCT Filed: Feb. 17, 2006

(86) PCT No.: PCT/EP2006/001464

§ 371 (c)(1),
(2), (4) Date: Jul. 26, 2007

(87) PCT Pub. No.: WO2006/087212

PCT Pub. Date: Aug. 24, 2006

(65) Prior Publication Data

US 2008/0101432 A1     May 1, 2008

(30) Foreign Application Priority Data

Feb. 19, 2005    (DE)  ............ 10 2005 007 655

(51) Int. Cl.
*F27D 1/02*     (2006.01)
*F27D 25/00*     (2006.01)
*F27D 3/00*     (2006.01)
(52) U.S. Cl. ............... 373/73; 373/78; 373/79
(58) Field of Classification Search ........... 373/71, 373/73, 75, 78, 79, 82, 72, 66
See application file for complete search history.

(56) References Cited

U.S. PATENT DOCUMENTS

| | | | | | |
|---|---|---|---|---|---|
| 4,841,542 | A | * | 6/1989 | Zajicek et al. | ............... 373/73 |
| 5,306,474 | A | * | 4/1994 | Kida et al. | ............. 422/245.1 |
| 5,363,796 | A | * | 11/1994 | Kobayashi et al. | ............ 117/30 |
| 6,038,246 | A | * | 3/2000 | Shimizu et al. | ............... 373/78 |
| 6,201,826 | B1 | * | 3/2001 | Giannoulidis et al. | ......... 373/78 |
| 2002/0071473 | A1 | * | 6/2002 | Stercho | ...................... 373/78 |

FOREIGN PATENT DOCUMENTS

DE    103 32 866    3/2004
EP     0 717 115    6/1996

OTHER PUBLICATIONS

Trenkler H: "Energy-Saving DC Twin Shell ARC Furnace for Melting . . . ", ABB Review, ABB Asea Brown Boveri, Zurich, Ch, No. 9/10, 1996, pp. 18-27.

* cited by examiner

*Primary Examiner*—Tu B Hoang
*Assistant Examiner*—Hung Nguyen
(74) *Attorney, Agent, or Firm*—Lucas & Mercanti, LLP; Klaus P. Stoffel

(57) ABSTRACT

To increase the efficiency in a furnace installation for melting down metallic or metal-containing charge materials, where an electrode system with a roof (6) for operating the melting-down process mainly with secondary energy can be swung into position on a lower shell part (14, 15) of a furnace (A, B), an upper shell part (17) can be swung into position on the lower shell part (14, 15) to form a premelting vessel (16). The upper shell part (17) includes a vessel wall (18) that substantially upwardly extends the vessel wall of the lower shell part (14, 15) in and additionally has a roof (7).

13 Claims, 2 Drawing Sheets

FURNACE INSTALLATION AND METHOD FOR MELTING DOWN METALLIC OR METAL-CONTAINING CHARGE MATERIALS

The invention concerns a furnace installation and a method for melting down metallic or metal-containing charge materials.

DE 44 34 369 A1 and EP 0 717 115 B1 describe twin arc furnace installations with which refining and melting down processes are successively carried out. Iron charge materials are alternately charged into the two furnaces, nonelectric heat energy is provided by supplying oxygen, and a refining process is carried out. Heat energy is then introduced by an electric arc, the slag is removed, and the liquid melt is tapped.

A similar method is also carried out in the twin-furnace installation disclosed in DE 103 32 866 A1. This twin-furnace installation is distinguished by the fact that, besides the two furnaces, the electrode support device is installed on a separate tilting platform, where the third tilting platform can be tilted directly dependent on the tilting movements of one of the two furnace platforms for a furnace shell at a given time.

It is also known that, in a furnace installation that consists of two individual tiltable furnace shells, iron charge materials (scrap, DRI (direct reduced iron), or HBI) can be alternately melted down in the two furnaces by means of a swiveling electrode system with electric energy with the introduction of only a small amount of primary energy by burners.

The melted charge material is then superheated and adjusted to the desired analysis. In this regard, it has been found to be not very advantageous that the given shell that is not being used cools off and thus that the total energy consumption rises. The efficiency of the introduction of primary energy is also not very high, since only limited heat transfer can occur due to the insufficient height of the scrap above the burners. CO gas liberated during the melting down, escapes mostly uncombusted into the exhaust gas line.

Proceeding from this prior art, the objective of the invention is to create a furnace installation and a method that do not have these disadvantages.

This objective is achieved by the system with the features of Claim 1 and a method with the features of Claim 8. Advantageous modifications are described in the dependent claims.

The core of the invention is the utilization of primary and secondary energy for the melting down of metal scrap and DRI/HBI or other metallic or metal-containing materials. To this end, a furnace installation with preferably two furnace shells and a swiveling electrode system is supplemented by an additional upper shell part with an additional roof, which are installed on a rotary system in such a way that they can be placed on the lower shell part of a furnace. In a twin furnace installation, a rotary system is assigned to each furnace, or both furnaces are handled by a common rotary system.

By virtue of the fact that the shell wall of the lower shell part is substantially upwardly extended by the upper shell part, a furnace height is obtained which is considerably higher than the original height or the height of the other furnace in the case of twin furnaces. This results in a high degree of efficiency of heat transfer to the scrap.

Therefore, for one thing, a (pre)melting vessel in which primary energy is used is created by the lengthened upper shell part, and, for another, a furnace is created in which the further melting process and the superheating are carried out with the use of electric secondary energy.

In accordance with an advantageous modification, the shell wall of the upper shell part is water-cooled or lined with refractory material. The water cooling is achieved by means of water flowing through the shell wall, or the shell wall consists of a pipe-wall system.

Several high-power burners/injectors are built into the lower shell part and/or the upper shell part and are distributed around the circumference of the shell. These burners/injectors are used to melt down the charge column completely or at least to the extent that the upper shell part is free of charge material. After the charge material has been melted down, the upper vessel part and the associated roof are swiveled to the side, and the electrode system with its own roof is swiveled into position. The melting is completed by means of electric energy, possibly assisted by burners and carbon and oxygen injectors. In the meantime, the charge material in the other vessel (in the case of a twin furnace) is already being melted down with primary energy.

Further details and advantages of the invention are disclosed in the dependent claims and the following description, in which the specific embodiment illustrated in the drawings is explained in detail.

Figure 1:
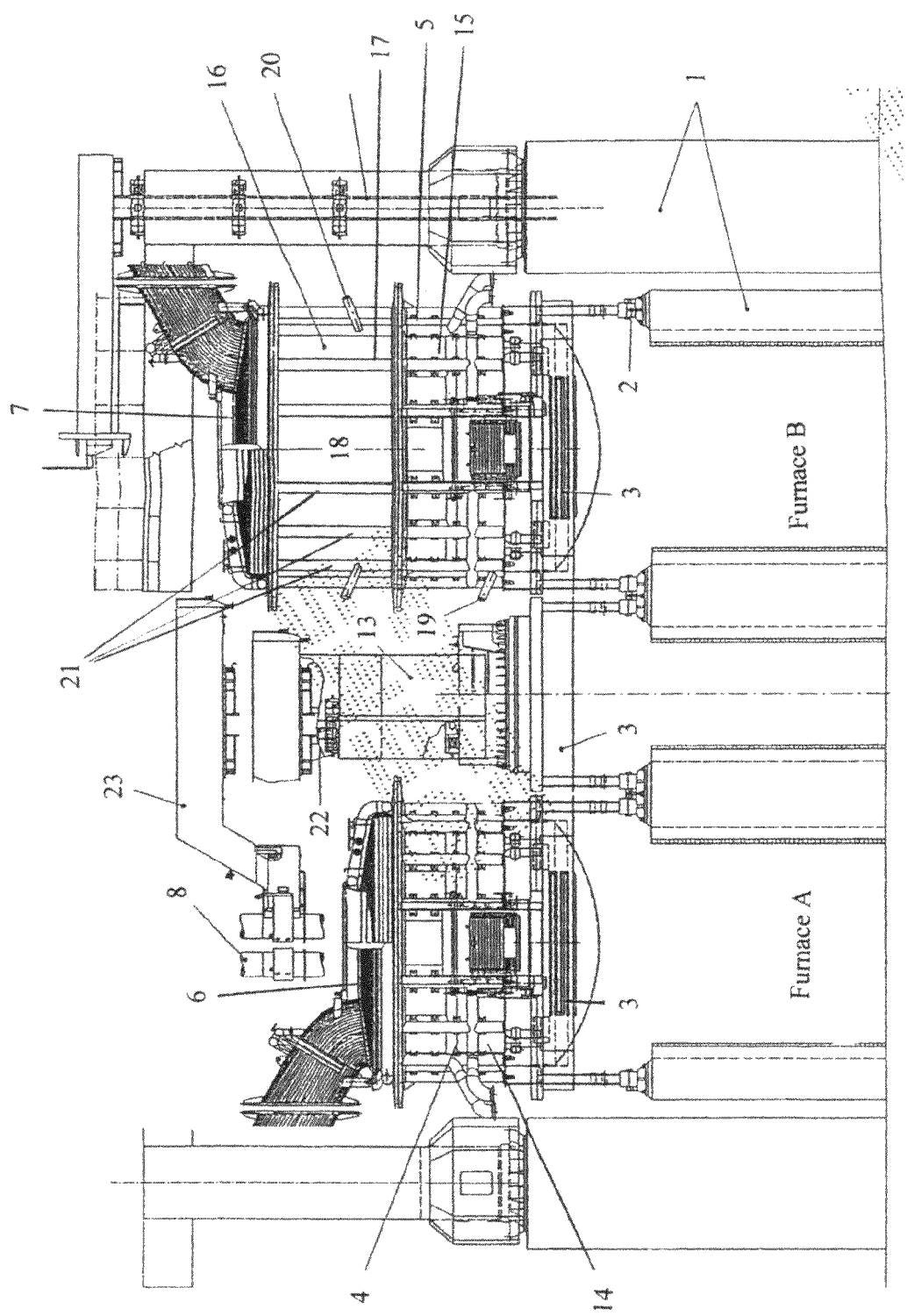
FIG. 1 shows a front elevation of a twin furnace installation.
Figure 2:
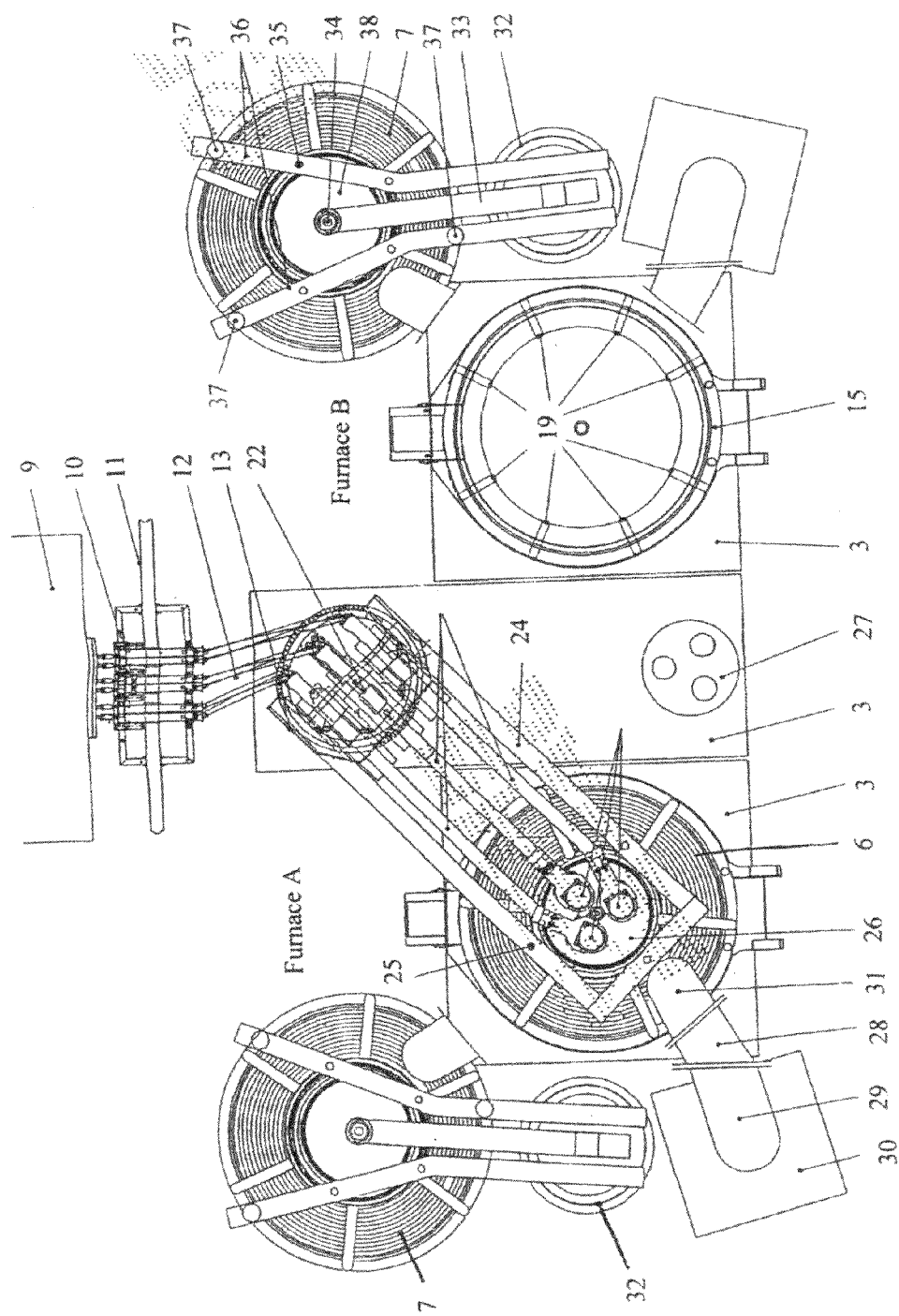
FIG. 2 shows a top view of the twin furnace installation of FIG. 1 with a furnace roof swung away from the furnace shell B.

A tiltable furnace platform 3 for each furnace shell 4, 5 with a furnace roof 6, 7 is installed by means of a support 2 on foundations 1 for a furnace A and an identical furnace B of a furnace installation (see FIG. 1). Electrodes 8 are supplied by a furnace transformer 9 (see FIG. 2) via a high-current connection 10 through a transformer house wall 11 by means of high-current cables 12. The electrodes 8 can be swiveled over furnace A or furnace B by means of a swiveling column 13. The electrode system will be discussed in greater detail later.

Each of the two furnaces A and B or furnace shells 4, 5 comprises a corresponding lower shell part 14, 15, onto which the electrode system or the upper shell part 17 can be alternately placed. In the position shown here, an electrode roof 6 is placed on the lower vessel part 14 of furnace A. An upper shell part 17 is placed on the lower shell part 15 of furnace B. The upper shell part 17, which serves as a (pre)melting or (pre)heating vessel 16, has a vertical wall 18 with approximately the same vertical extent as the vertical wall of the lower shell part 15. The upper shell part 17 is closed at the top by a separate roof 7. Burners 19 (see FIG. 2 also) are installed along the circumference of the lower shell part 15 and serve to introduce primary energy sources into the lower shell part 15. Tuyeres 20 or injectors for air or oxygen are installed along the circumference of the upper shell part 17 to realize systematic combustion of the CO gas that forms during the melting down of the charge column.

Cooling pipes 21, through which water flows, extend along the vessel wall 18 of the upper shell part 17. Alternatively or additionally, the wall 18 can be lined on the inside with refractory material.

The electrode system comprises electrodes 8, which are positioned by means of the lifting column 22 with a column guide and a lifting cylinder for electrode control and the electrode support device 23. Jib arms 24 are provided for the roof 6, which can be adjusted in height by lifting cylinders 25 (see FIG. 2). The core of the electrode is designated 26. An electrode replenishing device 27 is also provided.

A stationary exhaust gas pipe 29 with a secondary combustion chamber 30 is to be connected to the exhaust gas pipe 28, which is connected with the tiltable platform 3, in the swung-in position of the electrode. An exhaust gas pipe connection 31 is connected to each roof. In regard to these exhaust gas pipes and other details of the jib arm lifting device with lifting cylinders, refer to the disclosed content of DE 103 32 866 A1.

A third tiltable platform 3 is located between the furnace platforms 3 of the furnaces A and B. The swiveling column 12 and the electrode replenishing device 27 are located on this third tilting platform 3.

The upper shell part 17, its roof 7, and their swiveling mechanism will now be described. 32 designates a swiveling column for swiveling the upper shell part 17 with roof 7. A separate swiveling column 32 is assigned to each furnace A and B. In detail, the swiveling column 32 consists of an inner, middle jib arm 33, at the end of which a burner 34 is mounted, which is supplied via a line that runs through the jib arm. The burner 34 is supported by the jib arm 33, which is connected with a guide column and is guided in guide rollers. The lifting movement of the jib arm 33 and burner 34 is carried out by a hydraulic cylinder installed in the guide column. The primary energy can be introduced basically only by powerful side burners 19 in the lower shell part 14, 15 or powerful side burners 19, in the lower shell part 14, 15 and upper shell part 17. Primary energy can be additionally supplied by burners 34.

The swiveling device additionally comprises a lifting device 35 for the upper shell part 17 with roof and two jib arms 36.

Lifting cylinders 37 for the upper shell part 17 with roof are arranged along the jib arms 36. The roof 7 with the upper shell part 17 is swiveled over the lower shell part and then moved downward into a closed position by means of the lifting cylinders 37 by the movement of the corresponding piston rods. 38 designates the core.

Different process states of the melting-down process are illustrated by the two drawings. While melting down or superheating mainly with secondary energy is occurring in furnace A, the charge column, especially a scrap column, is being melted down at the same time in furnace B by means of primary energy.

To this end, the upper shell part 17 or the premelting vessel 16 with a roof 7 is set onto the lower shell part 15 by swiveling the lifting device 35 by means of the swiveling column 32. The roof 7 and the upper shell part 17 are then uncoupled, and the roof 7 is swung away. The charge materials are then charged into the open vessel. DRI and HBI can also be charged through separate openings in the roof 7. The charge materials are charged in a way that results in the formation of a charge column that extends into the upper shell part 17. The burner 34 is then possibly swung into position. Operation of the burners 19 and/or 34 causes the charge column to melt down at least to the extent that the upper shell part 17 is free of solid charge material. The upper shell part 17 with the roof 7 is then swung back out, and the electrode system is swung in. The charge is then further melted down or superheated by electric energy.

The proposed invention allows advantageous utilization of primary and secondary energy for melting down metal scrap, DRI, HBI, and other metallic or metal-containing materials.

The invention is aimed both at single-furnace installations and, in a modification of the invention, at twin-furnace installations.

LIST OF REFERENCE NUMBERS 1 foundations
2 support
3 tiltable platform for the furnaces and the electrode support device
4 furnace shell
5 furnace shell
6 furnace roof
7 furnace roof
8 electrodes
9 furnace transformer
10 high-current connection
11 transformer house wall
12 high-current cables
13 swiveling column for swiveling the electrodes
14 lower shell part
15 lower shell part
16 (pre)melting vessel
17 upper shell part
18 vessel wall
19 burners
20 tuyeres
21 cooling pipes
22 lifting column with column guide and lifting cylinder for electrode control
23 electrode support device
24 jib arms for the electrode inner roof
25 lifting cylinder(s)
26 electrode inner roof (electrode core)
27 electrode replenishing device
28 tiltable exhaust gas pipe
29 stationary exhaust gas pipe
30 secondary combustion chamber
31 exhaust gas pipe connection
32 swiveling column for swiveling the upper shell part with roof
33 middle jib arm
34 burner
35 lifting device for the upper shell part with roof
36 jib arms for the upper shell part with roof
37 lifting cylinders for the upper shell part with roof
38 core

The invention claimed is:

1. A furnace installation for melting down metallic or metal-containing charge materials, which comprises at least one furnace (A, B) with:
   a lower shell part (14, 15) and an upper shell part (17), which is placed on the lower shell part, where the upper shell part (17) comprises a vessel wall (18) that upwardly extends the vessel wall of the lower shell part (14, 15) and additionally comprises a roof (7); and
   burners (19, 34) for introducing primary energy into the lower shell part (14, 15) or the upper shell part (17) for melting down a charge column formed from charge material to produce a melt;
   wherein said furnace installation comprises an electrode roof (6) with an electrode system (8), which electrode roof is swung into place on the lower shell part (14, 15) in place of the upper shell part (17) after the charge column has melted down so that the upwardly extended upper shell part (17) is free of charge material, and the upper shell part has been swung away, to complete melting mainly with secondary energy.

2. A furnace installation in accordance with claim 1, wherein the vertical extent of the vessel wall (18) of the swiveling upper shell part (17) is greater than or equal to that of the vessel wall of the lower shell part (15).

3. A furnace installation in accordance with claim 1, wherein side burners (19) are arranged along the circumference of the lower shell part or upper shell part.

4. A furnace installation in accordance with, claim 1, wherein a burner (34) for introducing primary energy is assigned to the upper shell part (17) and is inserted in the vessel from above.

5. A furnace installation in accordance with claim 1, wherein the vessel wall (18) of the upper shell part (17) is water-cooled or lined with refractory material.

6. A furnace installation in accordance with claim 1, wherein burners (19) or tuyeres (20) or injectors for introducing air or oxygen are installed in the lower shell part (15) or upper shell part (17).

7. A furnace installation in accordance with claim 1, wherein it is designed as a twin-furnace installation, where an electrode system with a roof (6) is placed on the lower shell part (14, 15) of one of the furnaces (A, B), and an upper shell part (17) is placed on the other furnace (B, A), and these placements can be alternated.

8. A method for operating a furnace installation with at least one furnace (A, B), which has a lower shell part, for melting down metallic or metal-containing materials, which comprises the following steps:
   placement of an upper shell part (17) onto the lower shell part (15) (A, B), where the upper shell part (17) has a vessel wall (18) that extends the vessel wall of the lower shell part (15), as well as a roof (7),
   charging of the charge materials in the form of a charge column that extends into the upper shell part (17), and introduction of primary energy into the upper shell part (17), to melt down the charge column,
   wherein said method comprises
   swiveling of the upper shell part (17) together with its roof (7) away from the lower shell part (15) when the charge column has melted down so that the upper shell part (17) is free of solid charge materials, and
   closing of the lower shell part (15) with an electrode roof (6) to complete the melting mainly with secondary energy, which is supplied by an electrode system associated with the electric roof (6).

9. A method in accordance with claim 8, wherein the primary energy is introduced by burners (19) that are installed at least along the side, and that during the melting down by means of the burners (19), a reducing or only weakly oxidizing furnace atmosphere is adjusted.

10. A method in accordance with claim 8, wherein CO gas that forms within the charge column is systematically combusted by injected air or oxygen, and melting energy is used as combustion energy.

11. A method in accordance with claim 8, wherein carbon carriers are mixed with charge material to support the process of melting down the charge material.

12. A method in accordance with claim 8 wherein the further melting down of the charge mainly by secondary energy is assisted by the introduction of additional primary energy by burners (19) and carbon and oxygen injectors.

13. A method in accordance with claim 8 wherein a melting process is carried out in one of the furnaces (A, B) of a twin-furnace installation by swinging an upper shell part (17) into position and introducing primary energy, and that this melting process alternates with a melting process or a superheating process carried out mainly with secondary energy after an electrode system is swung into position.

* * * * *